United States Patent [19]

Hignette et al.

[11] Patent Number: 5,191,393
[45] Date of Patent: Mar. 2, 1993

[54] OPTICAL MEASUREMENT DEVICE AND METHOD

[75] Inventors: Olivier Hignette, St. Germain; Michel Lacombat, Saclay, both of France

[73] Assignee: Micro-Controle, Cedex, France

[21] Appl. No.: 555,510

[22] PCT Filed: Dec. 5, 1989

[86] PCT No.: PCT/FR89/00630
§ 371 Date: Oct. 15, 1990
§ 102(e) Date: Oct. 15, 1990

[87] PCT Pub. No.: WO90/06489
PCT Pub. Date: Jun. 14, 1990

[30] Foreign Application Priority Data

Dec. 5, 1988 [FR] France ............... 88 15902

[51] Int. Cl.⁵ .................. G01B 11/02; A61N 5/00
[52] U.S. Cl. .................... 356/384; 250/560; 250/492.2; 250/461.1; 385/8
[58] Field of Search ........... 356/372, 384, 381, 382, 356/385–387, 399, 400; 250/201.1, 201.3, 201.4, 372, 461.1, 359.1, 491.1, 492.2, 560, 561

[56] References Cited

U.S. PATENT DOCUMENTS

| | | | |
|---|---|---|---|
| 4,385,837 | 5/1983 | Schram | 356/372 |
| 4,403,826 | 9/1983 | Presby | 250/372 |
| 4,639,587 | 1/1987 | Chadwick et al. | 250/201.3 |
| 4,656,358 | 4/1987 | Divens et al. | 356/386 |
| 4,659,936 | 4/1987 | Kikkawa et al. | 356/387 |
| 4,674,883 | 6/1987 | Baurschmidt | 356/384 |
| 4,744,665 | 5/1988 | Kirk | 356/384 |
| 4,776,695 | 10/1988 | Pham et al. | 356/382 |
| 4,844,617 | 7/1989 | Kelderman et al. | 356/381 |
| 4,884,890 | 12/1989 | Coates | 356/384 |
| 4,938,600 | 7/1990 | Into | 250/491.1 |
| 4,945,220 | 7/1990 | Mallory et al. | 250/201.3 |

FOREIGN PATENT DOCUMENTS 0103507 5/1987 Japan ................ 356/384

Primary Examiner—Richard A. Rosenberger
Assistant Examiner—Hoa Q. Pham
Attorney, Agent, or Firm—Larson and Taylor

[57] ABSTRACT

Method for optically measuring submicron dimensions of an object or covering between two objects, and device implementing such method, wherein a light beam (23) is emitted by means of an arc lamp (22) into a system (21) with an optical monofibre (8) having a diameter larger than 500 μm and a length longer than 3 m, the beam (23) is focussed to the object to be measured through the lens (32) of a microscope, the reflected beam passing through the microscope lens is separated from the incident beam in order to direct it towards the sensors of the matrix cameras (41, 42) of the charge coupling type and the spatial signals thus obtained are processed in order to reconstitute the contours of the object or to measure the covering between the two objects.

11 Claims, 6 Drawing Sheets

OPTICAL MEASUREMENT DEVICE AND METHOD

BACKGROUND OF THE INVENTION

The present invention relates to the optical measurement of the dimensions, submicron or close to a micron, of an object and measurement of the amplitude amount of overlay of two superimposed objects or patterns, and more particularly a method and device for obtaining very high measurement accuracy, less than one tenth of a micron. The invention finds a particularly important, although not exclusive, application in the automatic control of the widths of lines on wafers carrying patterns of integrated circuits with larger scale integration, overlay of the thin layers forming said wafers and/or integrated circuit wafer mapping.

The technology of production of integrated circuits evolves rapidly and particularly the width of the lines of the integrated circuits does not cease to diminish. At the present time, integrated circuit production technologies make it possible to etch lines of about one micron, but these technologies are rapidly outstripped. Lines of 0.1 micron can already be obtained experimentally and the American SEMATEC program (Semiconductor Manufacturing Technology) foresees the development of a technology for producing static memories SRAM of 16 Mbits with line widths of 0.3 micron and wastage less than 3% for the beginning of the 1990s.

It then becomes imperative to improve, both from the accuracy and reliability points of view, the measurement of the critical dimensions of submicron lines. The objective in the accuracy of measurement of the critical dimensions for future technologies in the production of integrated circuits is about 0.01 micron. No process, no device of the prior art makes it possible to fulfil such specifications.

Similarly, the degrees of overlay between the patterns, which are normally superimposed, of two layers of integrated circuits must be controlled with better accuracy; in fact, measurements of the overlay of layers by optical vernier or by electronic control are not satisfactory, at least in certain stages of production of a wafer.

SUMMARY OF THE INVENTION

It is an object of the invention to provide an improved optical particularly in that they make possible an accuracy up to now unequalled in the measurement of the width of lines and the measurement of the overlay between layers, with great reliability and repeatability, making it possible to automate them. For example, an accuracy of about ±0.02 micron has been obtained on lines of a width of 0.5 micron on a thin layer (thickness less than 800 nm) or an accuracy of about ±50 nm on the overlay of thick metal layers (>4 micron).

For this, we have oriented their research to an optomechanical type device using a microscope with an arc lamp, whereas, a priori, such a conception is not satisfactory for reaching the desired results. The optical resolution is in fact limited to about 0.5 micron in visible light. In addition, the heat released by an arc lamp and/or the luminance losses observed with prior art devices when the light source is distant from the measurement position are too high for contemplating interesting results.

The use of ultraviolets (U.V) giving better resolution seems a priori excluded, again because of the considerable luminance losses observed with devices of the above type in the prior art and/or of the heat released by the U.V. emitting arc lamps.

The inventors have moreover met the problem of obtaining substantially constant uniformity, within ±2%, in the pupil (II) and object (I) planes of the optical system used.

By way of indication, the prior art optical devices have at best far field uniformity in the object plane (I) of about 10% and near field uniformity in the pupil plane (II) which is frankly poor (>20%). Such defects in the prior art devices are a serious obstacle and do not allow the desired performances for controlling the critical dimensions of the high integration circuits (VLSI) of future years. As an example of the prior art, means must be further mentioned for the mathematical modeling of the image which allows the dimensions of an image to be reconstituted with a precision exceeding the separating power of the optical system used, for given wavelength ranges.

The principles of such modeling for controlling the critical dimensions, are described in the article :"Accurate image modeling for submicron CD optical control" by M. E. Guillaume, P. Livrozet, J. L. Buevoz and M. Alcouffe-Noally (Microelectric Engineering 6-1987).

Finally, a method is known for measuring overlays whose principles have been described in another article : "A new signal processing method for overlay and grid characterization measurements by O. Hignette, M. E. Guillaume, and M. Alcouffe-Noally (Microelectronic Engineering 6-1987; 637-643); this method is suitable for use in the implementation of the invention.

The invention aims at providing an integrated circuit control method and device allowing the effective use of these methods and especially giving improved industrial results, and this particularly while improving the luminosity and uniformity performances in the pupil (II) and object (I) planes of at least one order of size with respect to the prior art.

For this, the invention proposes in particular a method for optically measuring the submicron dimensions of an object or the overlay between two objects, characterized in that:

a light beam is emitted by means of an arc lamp into an optical monofiber of a diameter greater than 500 microns and of a length greater than 3 m, the light beam from the optical monofiber is directed, at normal incidence, while focussing it on the object to be measured through a microscope lens, focussing on the object to be measured being carried out automatically by a self-focussing infrared system, the reflected beam passing through the microscope lens is separated from the incident beam and is directed on to a sensor of a matrix camera of charge coupling type having digitization means delivering a pixel by pixel representation of the field of the microscope, and the spatial signals thus obtained are processed in order to reconstitute, from said signals, the contours of the object for measuring the distance between these contours, or for measuring the overlay between two objects in the field.

A simple processing method is formed by the comparison with a predetermined, possibly adjustable, threshold value. A better method, but more complex, uses the Fourier transform for reconstituting the contours and for the mathematical cross correlation of the signals with the symmetrical image of the signals with respect to an arbitrary origin for measuring the degree of overlay.

The use of a pure silica optical monofiber of large diameter (500 microns to 1 mm), allows the light to be transported over several meters without substantial luminance attenuation contrary, for example, to what occurs with a multifiber optical bundle. It is therefore possible to transfer the light source outside the clean room in which the integrated circuits are controlled. Thus, the heat and dust source formed by the light source itself is eliminated, which on the one hand improves the measurement conditions and, on the other, makes it possible to use a very high energy lamp of arc lamp type.

It seemed that the structural defects of a large diameter (>500 microns) optical monofiber, in particular the condition of its output surface, would exclude it a priori from a device for which very high accuracy is required.

Contrary to this accepted idea, the inventors have discovered that with the method of the invention and the device for putting it into practice, exceptional results could be obtained.

In an advantageous embodiment, the method uses, on the one hand, visible light and, on the other, ultraviolet light.

The use of ultraviolet light for controlling and measuring very small dimensions is particularly interesting. On the one hand it makes it possible to lower the resolution limit (proportional to the wavelength) and, on the other hand, it confers on the object observed an appreciably more stable contour profile as long as a sufficient spectral width of the source (>20 nm) is used. The algorithms used for obtaining the desired accuracy are simplified correspondingly and the repeatability of the measurements is also improved.

The invention also provides a device for implementing the above defined method, characterized in that it comprises:

- an optical fiber system comprising an arc lamp emitting in the visible and ultraviolet, a condenser and an optical fiber of a diameter greater than 500 microns delivering a light beam containing at least two predetermined wavelengths, one in the visible and the other in the ultraviolet,
- means placed in the path of the beam from the optical monofiber for directing the beam at normal incidence on the object to be measured,
- at least one microscope lens adapted to be placed in the path of the beam from the monofiber towards the object,
- self-focussing means for automatically focussing the microscope lens on the object (for example of the type described in French patent No. 87 12699 of Sep. 14, 1987),
- means placed in the path of the reflected beam coming from the microscope lens for sending at least a part of said reflected beam towards the sensor of at least one charge coupling matrix camera having digitization means, delivering a pixel by pixel representation of the field of the microscope,
- and means for processing the spatial signals obtained, comprising means for reconstituting from said signals the contours of the object and measuring the distance between these contours, and/or means for measuring the overlay between two objects, particularly by intercorrelation of the signals obtained with the symmetrical image of said signals with respect to an arbitrary origin.

In advantageous embodiments, recourse is further had to one and/or other of the following arrangements:

- the device comprises means, placed in the path of the beam reflected by the object and leaving the microscope lens, for separating the U.V. component from the visible component, sending the U.V. component towards a camera with a matrix of sensors responsive to the U.V. and sending the visible component to a camera with a visible light sensor matrix, the light condenser is an achromatic condenser in the visible and ultraviolet comprising:
  an anticaloric dichroic filter,
  a first off-axis paraboloid mirror adapted for collimating the light which it reflects towards the second off-axis paraboloid mirror adapted for recondensing said light into a point, and
  means for filtering said light in the visible and ultraviolet disposed in the path of the collimated light beam between the two off-axis paraboloid mirrors,
- the device comprises means placed in the path of the reflected beam coming from the microscope lens for sending at least a part of this energy of the reflected beam to the sensor of a color camera delivering a visual representation of the object observed,
- the device comprises means placed in the path of the reflected beam for directing at least a part of the energy of said reflected beam towards spectrophotometric analysis means and, from the means processing the signals obtained on the matrix camera(s) for minimizing the contrasts between the object and its immediate environment.

Surprisingly, these means in fact make it possible to obtain better accuracy in the dimensional measurement for measuring the information on the edges of an object,
- the means for processing the signals obtained by the sensor matrix cameras comprise means for measuring the width of the lines on a wafer and/or measuring the overlay of the thin layers forming a wafer,
- the device comprises optical means for measuring the object either on a light background or on a dark background,
- the device comprises coherent light interferometric means for positioning, with respect to a reference position, a table on which the observed object is placed, said means comprising a reference mirror connected rigidly to the measuring lens of the microscope and a mirror fixed rigidly to the table, the differential measurement of the interferometer taking place between said mirror and a mirror fixed rigidly to the table.

Such an arrangement generates an excellent repeatability of the measurements, for example of 30 nm at 3 over 200 mm, which presents great interest in the mapping of integrated circuits.

The invention will be better understood from reading the following description of a particular embodiment, given by way of non limiting example.

DETAILED DESCRIPTION OF THE INVENTION

Figure 1:
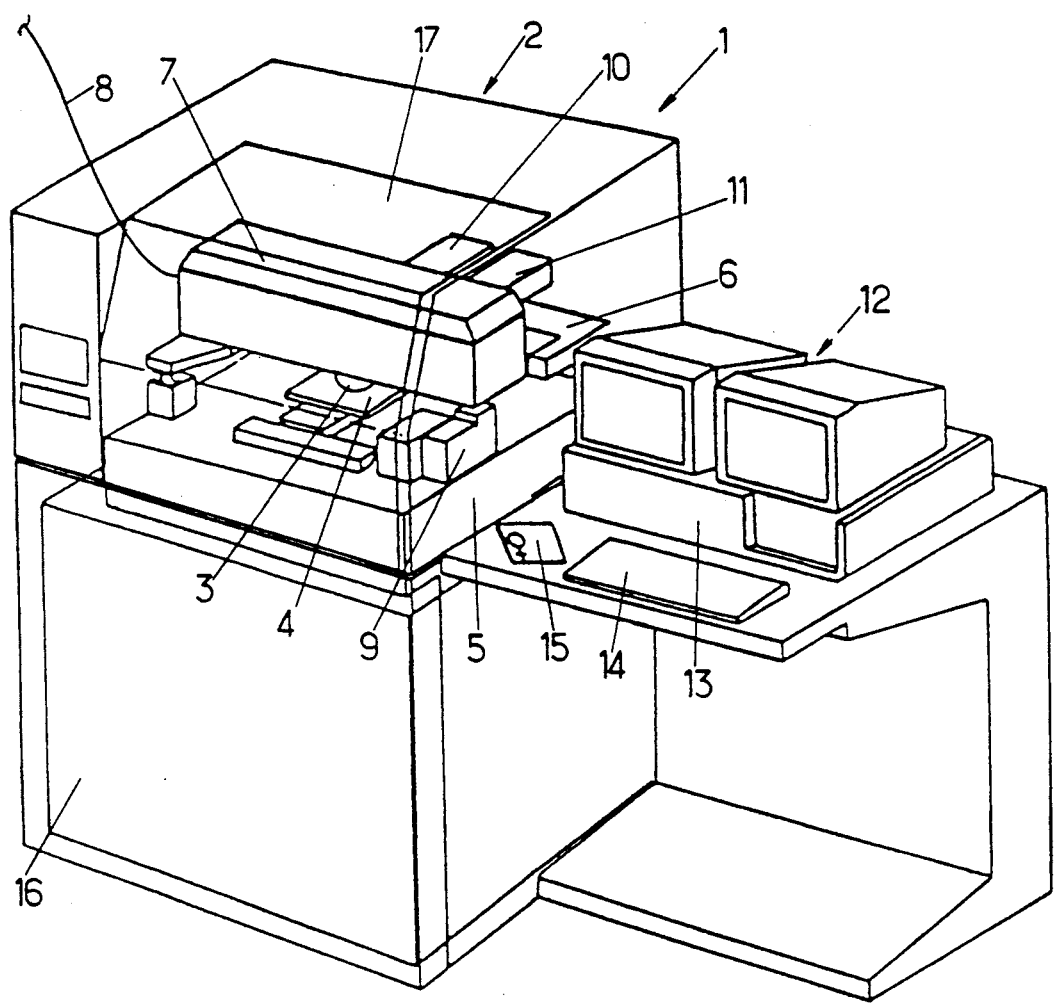
FIG. 1 is a perspective diagram showing an apparatus comprising one embodiment of the device according to the invention.

FIG. 1 shows an apparatus 1 comprising an optical measurement device 2 for optically measuring, in accordance with the invention, an object formed for example by a line on a wafer 3 comprising integrated circuit patterns. This wafer 3 is placed on a table 4 itself resting through an air cushion, in a way known per se, on a base 5, for example made from granite. it is thus completely isolated from ambient vibrations.

Means for moving the table in the horizontal plane along two orthogonal axes Ox, Oy, forming a reference frame, are provided. They comprise in particular interferometric means 6 for positioning table 4 extremely accurately in the reference frame Ox, Oy.

These means 6 comprise a laser interferometer of known type permitting mechanical positioning accuracy of the order of 0.01 micron.

Device 2 comprises an automatic optical microscope 7 connected by an optical fiber 8 to a distant light source (not shown in FIG. 1).

Means 9, for example formed by electric micro jacks make it possible to move microscope 7 along an axis Oz perpendicular to the horizontal plane formed by the reference frame Ox, Oy. Self focussing means 10 provide automatic focussing of microscope 7 on wafer 3. At least one sensor matrix camera 11 with charge coupled sensors (CCD) is provided. It is connected to means 12 for displaying and processing the signals, comprising for example a computer 13 of PC type and its control members such as a keyboard 14 and/or a mouse 15. Apparatus 1 also comprises an electric unit 16 for the power supply and control of device 2.

A sealed hood 17 for protecting the microscope is provided and allows said microscope to operate in a perfectly clean medium. The heat released inside the hood is removed by a cooling circuit known per se (not shown).

Figure 2:
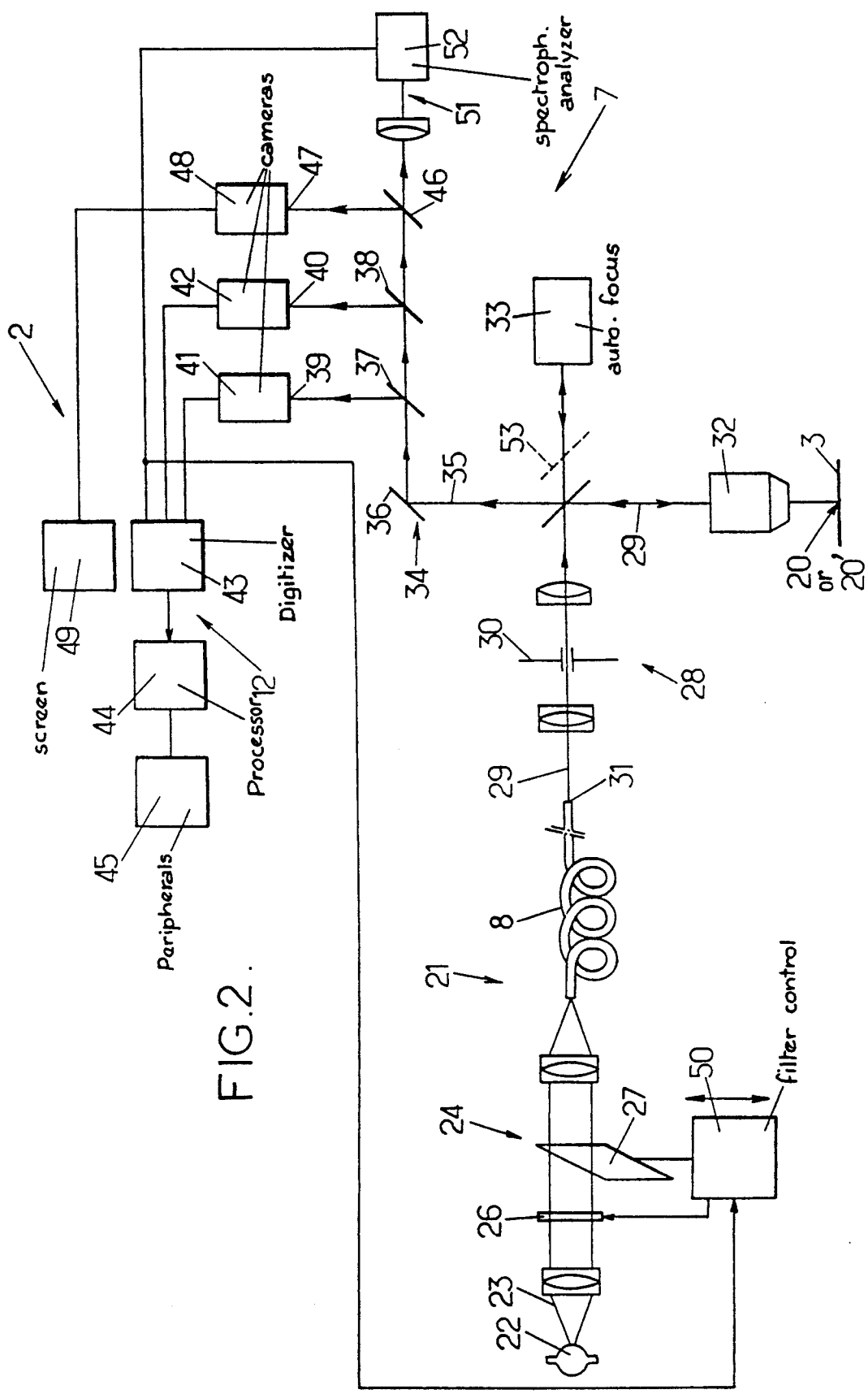
FIG. 2 is a simplified diagram of one embodiment of the device according to the invention.

FIG. 2 is a diagram of one advantageous embodiment of device 2 of the invention. It allows submicron dimensions to be measured of a line 20 of the integrated circuit wafer 3 or the overlap between two layers 20' forming an integrated circuit on a wafer 3. It comprises an optical monofiber system 21 with an arc lamp 22, for example a Xenon lamp, emitting a multi-spectral light beam 23 (U.V., visible), a condenser 24 and an optical monofiber 8.

Fiber 8 is made from practically pure silica, of a diameter greater than 500 microns, for example advantageously 1 mm, and of considerable length, often greater than 3 m. This length means that the optical fiber system 21 can be distant from the automatic optical microscope 7 which is therefore not disturbed by the heat source and the harmful effects of the arc lamp 22.

The optical fiber 8 may be partially wound on itself so as to homogenize the light beam which it conveys.

Condenser 24 comprises advantageously a filter 26 for only keeping narrow areas about two wavelengths selected in the visible and ultraviolet and a modulator 27 for modulating the light density of the light beam emitted by the arc lamp 22; in a variant, two filters 26 are provided, one transparent in the visible and the other in the ultraviolet (for example towards 300 nm, where the arc lamp has still appreciable emission).

Filter 26 makes it possible to vary the wavelengths used continuously. The movements of the filter with respect to the light beam may be automatic and controlled by computer 13.

Beam 23 is focussed by condenser 24 on the input surface of the optical monofiber 8. The light beam then leaves the monofiber in the form of a pencil beam 29 through a perfectly flat output surface 31. Means 28 placed in the path of the pencil beam 29 then direct beam 29 at normal incidence towards the object 20 of wafer 3. These means 28 comprise a diaphragm 30 for centering the beam. The diaphragm is advantageously removable. For example, four diaphragms of different apertures may be selected for obtaining perfectly centred lighting of the object.

Beam 29 is directed at normal incidence by a mirror or separator plate on to object 20 via a lens 32 of microscope 7. The microscope advantageously comprises several lenses, for example four lenses, which cover a field from 60 microns to 1.5 mm with enlargements of 2.5X, 20X, 50X and 80X.

Means 33 for automatically focussing lens 32 on the object are provided. They may be formed by a self-focussing system of the type described in the French patent application no. 87 12699 in the name of the Applicant and already mentioned and to which reference may be made. The self-focussing system uses a laser diode probe working in the infrared (at 780 microns for example), whose resolution is limited by diffraction. It delivers an error signal causing the operation of a motor which maintains the lens at a constant altitude with respect to the object, during translational movements of the latter. To obtain correct operation, the lens is achromatized.

The device 2 comprises an optical system placed in the path of the pencil beam 35 reflected by the object, via the lens 32 of microscope 7. These means have a first change of direction mirror 36 and separator plates 37, 38 which send parts of the reflected beam 35 respectively to the sensor matrices 39, 40 of the corresponding charge coupling sensor matrix cameras 41, 42.

For example, mirror 37 separates the U.V. component from the visible component and sends the U.V. component to the sensor matrix 39 of the U.V. camera 41, and the visible component towards mirror 38 which sends a part at least of the visible light beam to the sensor matrix 40 of the matrix camera 42.

Cameras 41, 42 are connected to digitization means 43 delivering a pixel by pixel representation of the field of the microscope to means 44 for processing the signals received. Means 44 are formed by at least one computer having a control unit and memories using stored data processing programs. Means 44 are adapted for processing the signals and reconstituting, from the signals, the contours of the object and the overlay between two objects, particularly when their dimensions are less at the resolution limit of the optical system than the predetermined wavelengths selected by filter 26. Peripherals 45 for controlling and checking the device are connected to the processing means 44.

The means for processing the signals may be provided for finding, in the case of measurement of the overlay, the position of the center of a figure which is symmetrical with respect to a given metrology (here the CCD matrix camera) as is described in the article by 0. Hignette, M. Alcouffe-Noally and M. E. Guillaume mentioned above. For that, means 44 comprise means for mathematical intercorrelation of the figure obtained by the sensor with its symmetrical image or mirror with respect to an arbitrary origin. The position of the maximum obtained with the intercorrelation figure defines a distance for the first layer, then for the second layer. By difference, the dimension of the overlay between the two layers is obtained. Computer 13 may be used for computing the differences and providing the result, with the desired accuracy.

In the case of dimensional control, i.e. the measurement of the width of a line, the signal processing means may comprise mathematical modeling means for forming images from the signals received by decomposition of said signals into orthogonal sine and cosine functions in the spatial frequency range corresponding to the Fourier transform of said collected spatial signals.

Such modeling, described in the article by M. E. Guillaume, P. Livrozet, J. L. Buevoz and M. Alcouffe-Noally mentioned above, makes it possible to reverse the physical problem, namely from experimental data (photometric profile) and applying a transfer function, to search for the best correspondence between physical data and modelled data by varying the parameters of the model according to the rapidly converging algorithms (method of least squares, Newton Ralphson, maximum entropy, etc.). The parameters of the model then give the desired width.

The device 2 also comprises means 46, formed by a separator plate inserted in the pencil beam passing through the separator plate 38, for sending a part at least of the energy of the pencil beam towards the lens 47 of a color camera 48 delivering a visual representation of the object observed, for example on a screen 49.

It is possible to vary the light density of beam 23, by means 50 comprising a motor or an electric jack acting on a plate forming the light density modulator 27 belonging to condenser 24.

Means 50 may also act on filter 26 via a second electric jack which, by moving filter 26 perpendicularly to the beam, varies continuously and automatically the wavelengths used.

In a preferred embodiment of the device according to the invention, means 51 are placed in the path of a part at least of the energy of the pencil beam reflected by object 20, after plate 46 in the case shown in FIG. 2, for directing this part of the energy towards spectrophotometric analysis means 52, known per se. These means 52 act on the means 50 controlling filter 26 and the density variator 27, thus minimizing the contrasts between the object and its immediate environment; this improves the performances of the microscope in dimensional control (C.D.).

Device 2 may also comprise means 53 for measuring the object, either on a light background or on a dark background. They are shown with a dotted line schematically in FIG. 2 and are known per se.

Measurement on a dark background minimizes the parasite lights and, by combining for example systematically and automatically light background measurements and dark background measurements of the same object, the measurement further gains in accuracy and reliability.

Figure 3:
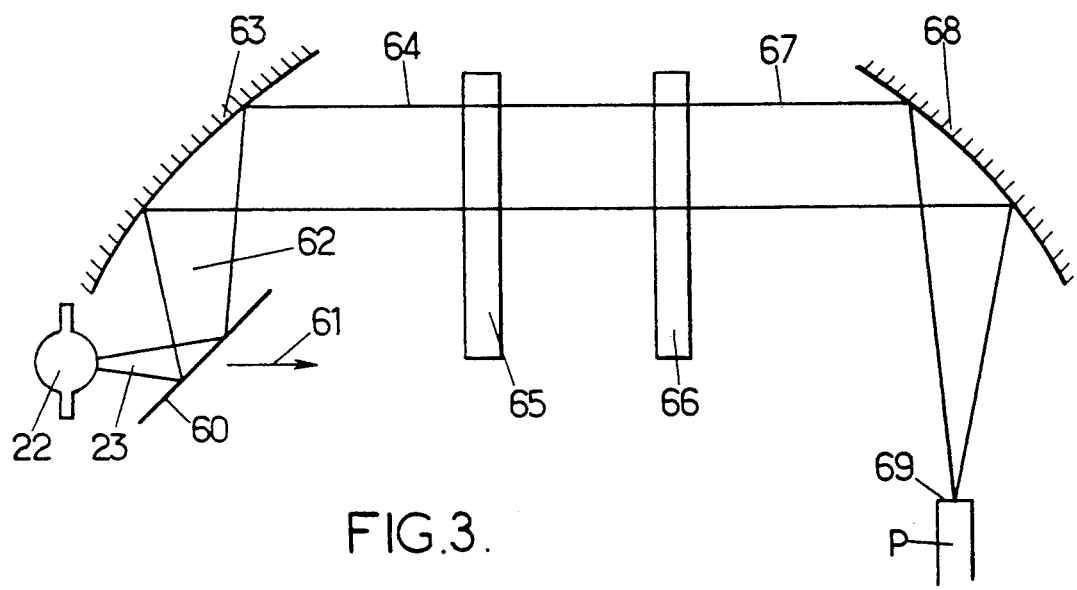
FIG. 3 is a simplified diagram of an advantageous embodiment of the condenser of the device according to the invention.

FIG. 3 shows an advantageous embodiment of the condenser of the device according to the invention.

Beam 23 of the high power arc lamp 22 (50 to 500 W, particularly 150 W), for example a xenon lamp, is received by an anticaloric dichroic filter 60 letting the infrared 61 pass and reflecting the ultraviolet and visible light on to an off-axis paraboloid mirror 63.

The collimated beam 64 is filtered by a filter 65 for the ultraviolet and visible, for example movable perpendicularly to the collimated beam 64 identically to the above described filter 26 and a device 66 for varying the light density continuously, just like plate 27 also described above.

The collimated beam 67 thus processed is again reflected from a second off-axis paraboloid 68 and focussed on the flat input surface 69 of the optical fiber 8 of device 2.

The off-axis paraboloid mirrors are advantageously coated with a material which is reflecting for ultraviolet and visible light, advantageously rhodium.

Figure 4:
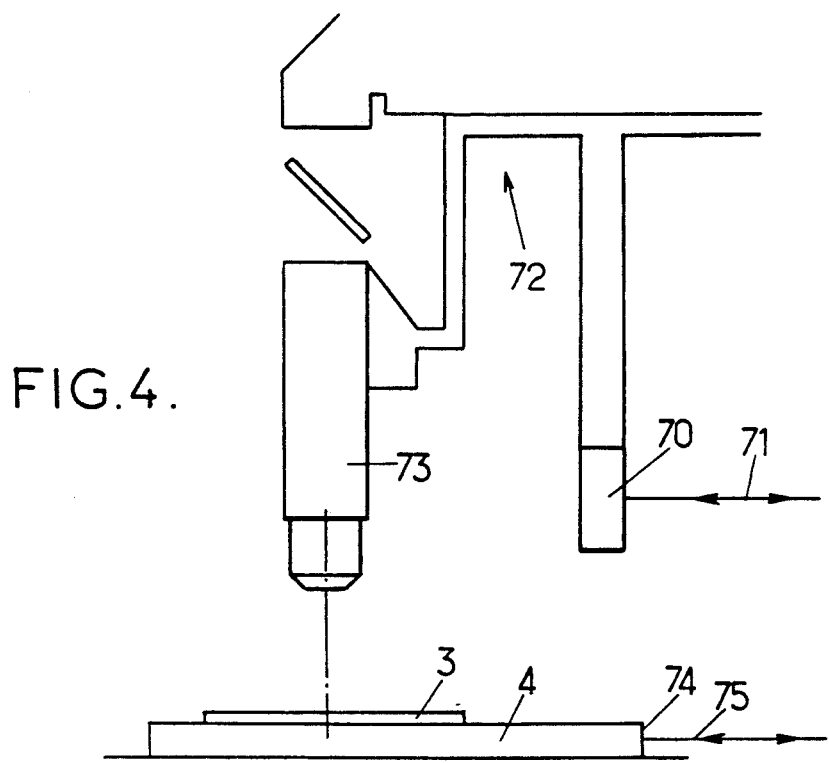
FIG. 4 is a simplified diagram of an interferometer circuit for position measurement on the device.

In FIG. 4, a preferred arrangement has been shown schematically of a part of the interferometric means 6 for measuring the position of table 4, on which wafer 3 is placed. These means comprise a mirror 70 adapted for reflecting the reference beam 71 of a laser interferometer. Mirror 70 is connected rigidly by means 72, for example partially removable, to the measurement lens 73. The differential measurement takes place between mirror 70 and a mirror 74 fixed rigidly to table 4 on which wafer 3 is laid.

Very high accuracy may thus be obtained in the positioning of wafer 3 with respect to lens 73 of microscope 7 because of this rigid connection between mirror 70 and lens 73.

Figure 5:
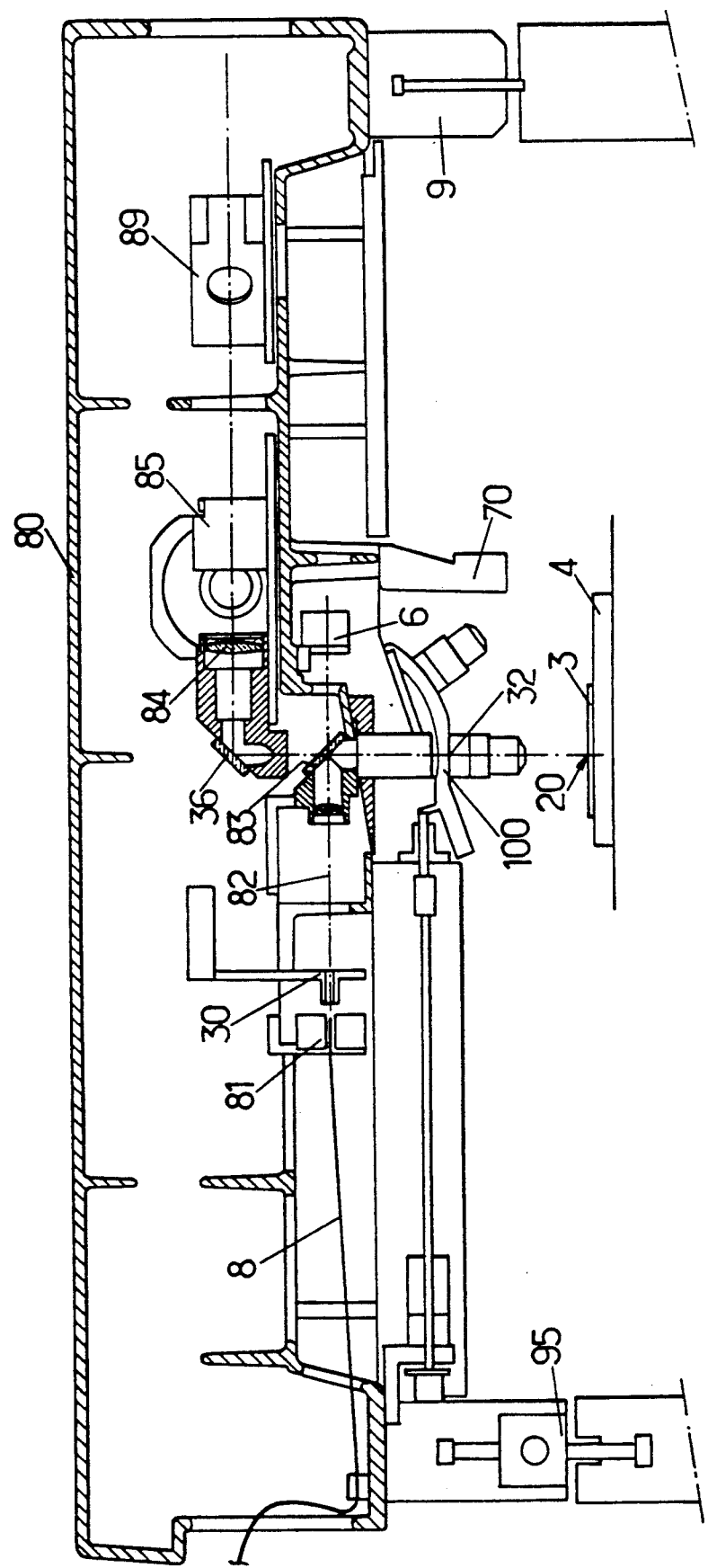
FIG. 5 shows a particular embodiment, in section and in elevation, of the optical part of part of the device of FIG. 2.
Figure 6:
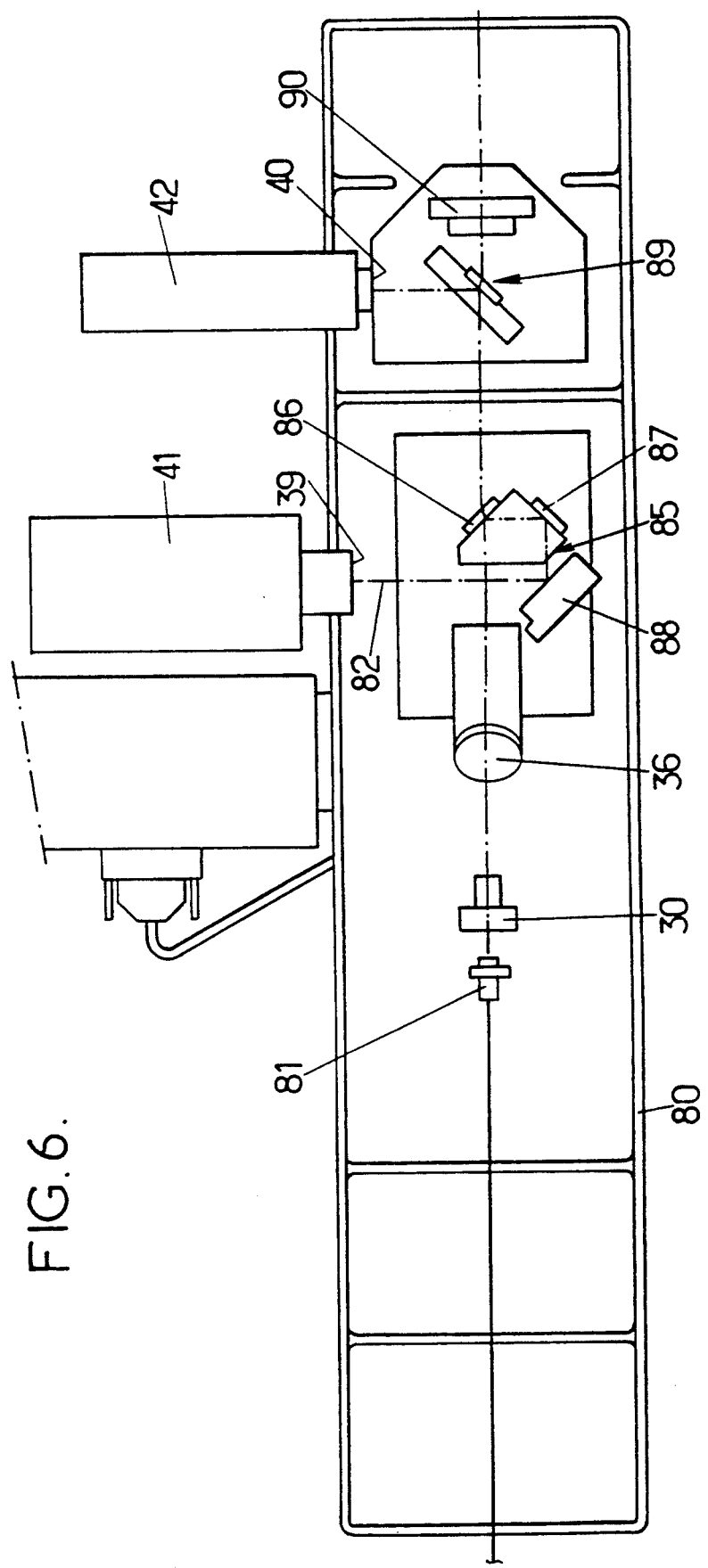
FIG. 6 is a top view, in section, of FIG. 5.

In the advantageous embodiment of the optical part shown in FIGS. 5 and 6, the microscope 7 comprises a carrier structure 80. The optical fiber 8 is centered and fixed rigidly to this structure by a fixing piece 81. The path of the beam from the optical fiber is represented by a chain dotted line 82.

We find successively and essentially in this path:

a beam centering diaphragm 30 which is removable and replaceable by a series of appropriate diaphragms, selected so as to obtain perfectly centered optimum lighting of the object to be measured, a separator plate 83 between the incident beam and the reflected beam, for directing the whole of the energy of the beam coming from monofiber 8, at normal incidence, towards object 20 situated on wafer 3 resting on table 4, via the microscope lens 32, lens 32, mounted on an automatic turret 100 carrying for example three other lenses, for covering fields from a few microns to a few millimeters, again, mirror 83, this time transparent to the beam reflected orthogonally by the object, a mirror 36 for directing the reflected beam, via the optical means 40 (for example formed by a system of focussing lenses) towards means receiving the beam. These reception means comprise advantageously:

separation means 85 between the visible and ultraviolet light of the beam reflected by the object comprising (FIG. 6):

a plate 86, forming an ultraviolet/visible light filter, letting the visible light pass and reflecting the ultraviolet towards a set of mirrors 87, 88 and the sensor matrix 39 of the CCD ultraviolet camera 41, means 89 for extracting, from the beam reflected by the object, a part of the remaining energy in the visible, represented by a separator plate directing this part of the energy towards sensor 40 of a CCD camera 42 sensitive to visible light.

optical means 90 for focussing the remaining energy of the beam towards spectrophotometric analysis means 52, not shown in the FIGS. 5 and 6 and known per se.

These analysis means 52 make it possible in particular to minimize the contrast between the object and its environment by acting via the computing means 43 and the actuating means 50, on the wavelength variator filter 26 and on the light density variator 27 formed for example by a variable opacity plate (see FIG. 2).

Figure 7:
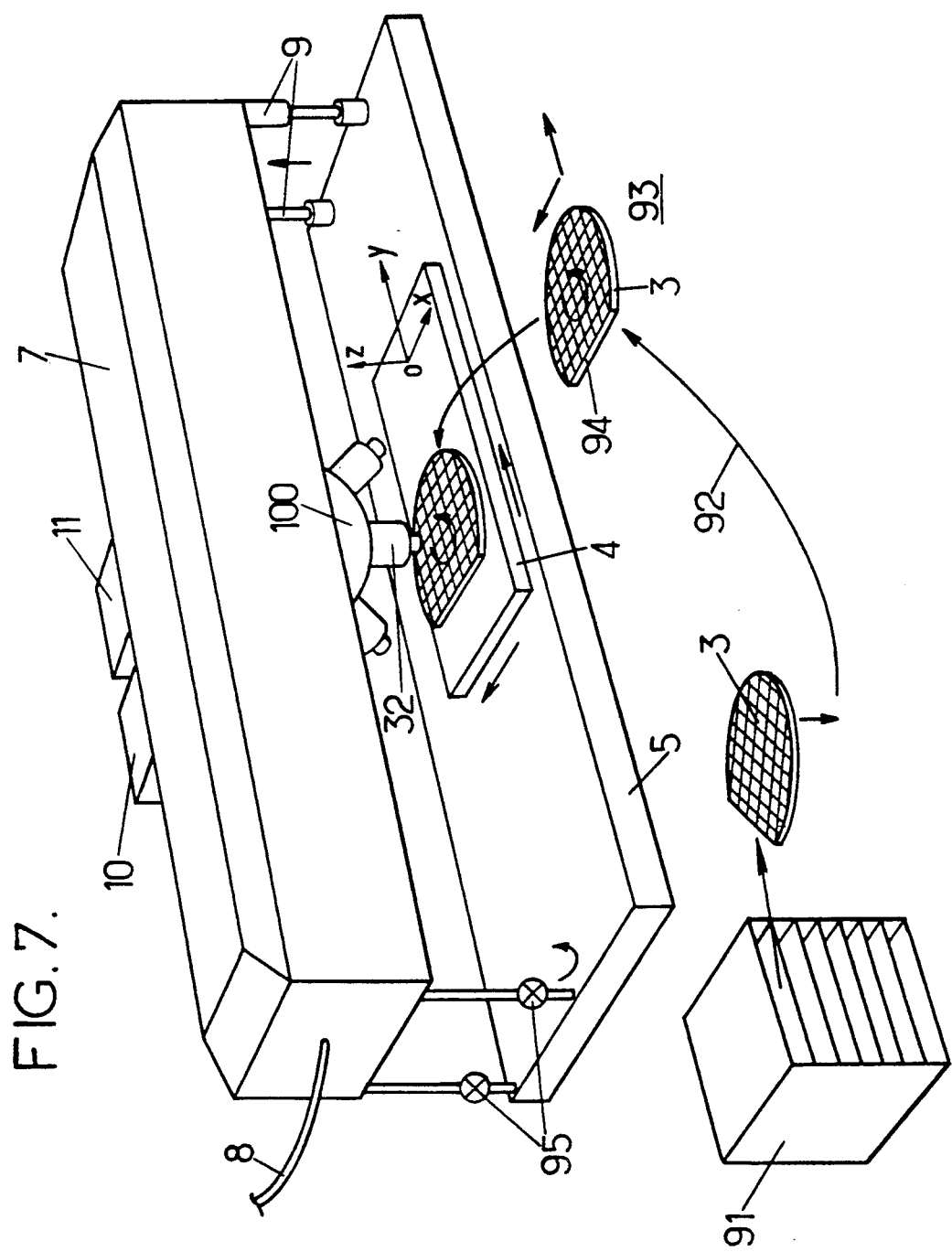
FIG. 7 is a diagram showing the mechanical operation of the apparatus of FIG. 1, comprising a device according to the invention.

Operation of the device according to the invention will now be described hereafter with reference more particularly to FIG. 7.

A wafer 3 comprising integrated circuit patterns is selected and extracted from a storage box 91 by an automatic robot arm (not shown) taking up the wafer by suction (vacuum pump).

The wafer is then transferred (arrow 92) to a pre-alignment station 93 where it is oriented, the cut edge 94 being for example oriented along Ox or Oy, by means not shown.

Wafer 3 is then placed automatically on the air cushion table 4 by the automatic robot arm, under lens 32 of microscope 7.

Alignment

The image of the integrated circuits of wafer 3 is then formed on the sensor of the visible light matrix camera 42 and converted into digital signals.

The digital signals are processed at a very high rate by the processing means 12 which control the automatic overall alignment along X, Y and O (angular alignment) of the wafer.

Once this alignment has been carried out, the whole being controlled and checked by interferometric means 6, table 40 is automatically placed in a predetermined starting position, for measuring objects, i.e. the patterns appearing on wafer 3.

The line width (C.D.), layer overlay and/or mapping measurements are then made.

The field of the microscope is reduced by successive lens changes (automatic rotation of turret 100) to attain 60 microns for example.

Each time, the self-focussing system 33 focuses on the object. In an advantageous embodiment of the invention, it actuates jacks 9 along Oz, the opposite bearing points of the structure 80 being for example mounted on ball joints 95.

Overlay and Dimensional Measurements

Each integrated circuit, or integrated circuit portion, is then examined successively following a programmed cycle, table 4 advancing step by step in directions Ox and/or Oy.

The successive signals obtained on the CCD cameras are processed by the processing means 43. The overlay measurements use the image in the visible, where the resins are transparent, delivered by camera 42. The dimensional measurements are effected at a wavelength in the ultraviolet where the resins are opaque, from camera 41, advantageously at a wavelength of about 300 nm.

These two types of measurement are effected successively, focussing being maintained by system 33.

Once these measurements have been made, the wafer is discharged and brought back to its storage box 91 automatically by the robot arm.

As mentioned above, the method and device of the invention make it possible to obtain better results than those obtained previously.

In order to better show this advantage, comparative tables are given hereafter between the invention and the prior art, concerning the order of size of the accuracies obtained and the repeatability of the measurements made, in the fields of the measurement of lines, measurement of overlap between layers and mapping.

The invention is particularly usable in the field of verifying and checking the characteristic dimensions of masks or integrated circuit topographies and for measuring objects of dimensions greater than a micron, for example 1.5 micron.

TABLE 1

| MEASUREMENT LINE WIDTH | INVENTION | | PRIOR ART (Threshold methods) | |
|---|---|---|---|---|
| | Accuracy | Repeatablity | Accuracy | Repeatability |
| Resin (thick layer >0.8 μm) | ±0.07 μm | 0.01 μm 3σ 3× typical deviation | not defined | 0.03 μm 3σ |
| Resin (thin layer <0.8 μm) on any type of material | | | | |
| line width >0.5 μm | ±0.02 μm | 0.02 μm (3× typical deviation) | not defined (>1 μm) | 0.03 μm 3σ |
| line width >0.3 μm | ±0.01 μm | 0.01 μm 3σ | | |

TABLE 2

| OVERLAY MEASUREMENT | INVENTION | | PRIOR ART | |
|---|---|---|---|---|
| | Accuracy | Repeatability | Accuracy | Repeatability |
| Non metal layer difference of height between patterns <1.5 nm | ±20 nm | 3 nm (at 3σ) | ±60 nm | 20 nm (3σ) |
| Metal layer line height >20 um | ±50 nm | 10 nm (at 3σ) | ±100 nm | 100 nm (3σ) |

TABLE 2-continued

| | INVENTION | | PRIOR ART | |
|---|---|---|---|---|
| OVERLAY MEASUREMENT | Accuracy | Repeatability | Accuracy | Repeatability |
| difference of height between patterns | | | | |

TABLE 3

| MAPPING of coordinates | INVENTION | | PRIOR ART | |
|---|---|---|---|---|
| | Accuracy | Repeatability | Accuracy | Repeatability |
| For all types of layers (>20 um) | 50 nm 3σ | 30 nm (at 3σ) | 200 nm 3σ | 100 nm 3σ |
| On masks or reticles | 50 nm 3σ | 30 nm (at 3σ) | 50 nm 3σ | 40 nm 3σ |

We claim:

1. A method for optically measuring submicronic dimensions of a line on an integrated circuit and an amount of overlay between two patterns on said integrated circuit, comprising the steps of:

delivering an incident light beam including energy in the visible and UV ranges from an arc lamp to an optical monofiber having a diameter greater than 500 microns and a length greater than 3 m., collecting said light beam originating from the optical monofiber, directing said light beam onto said integrated circuit through a microscope objective lens and substantially orthogonally thereto and focussing said beam on said integrated circuit automatically by an autofocussing system operating in infrared light, collecting a light beam reflected by said integrated circuit, after it has passed through said microscope objective lens, directing part of the energy of said reflected beam in the visible range onto a first CCD camera and part of the energy of said reflected beam in the UV range to a second CCD camera, each camera having sensors distributed in a matrix, digitizing signals delivered by said cameras with a means for delivering pixel-per-pixel digital representations of an optical field of the microscope objective lens, as space representation signals, and processing said space representation signals to reconstitute, from the signals in the ultraviolet range, the width of said lines and, from the signals in the visible range, the amount of overlay between the two patterns in the field, respectively.

2. A method according to claim 1, wherein the light directed to the first camera is filtered to only pass wavelengths close to 300 nm and the optical monofiber is of substantially pure silica.

3. A method according to claim 1, further comprising a preliminary step of aligning said integrated circuit using a visible light image delivered by said second camera.

4. A device for optically measuring submicronic dimensions of an individual object and an amount of overlay between two overlapping objects, comprising:

an illuminating optical fiber system comprising an arc lamp, a condenser and an optical monofiber having a diameter greater than 500 microns and a length greater than 3 m for delivering a light beam containing at least two predetermined wavlengths, one in the visible range and the other in the UV range, a means placed in a path of the beam delivered by the optical monofiber for directing the light beam orthogonally on the individual object to be measured, at least one achromatic microscope lens adapted to be placed in the path of the light beam from the monofiber to the individual object, a self-focussing means for controlling the lens and automatically focussing the light beam on the individual object, a means placed in the path of a beam reflected by the individual object and having passed through the microscope lens for sending at least a part of the ultraviolet energy of said reflected beam towards a first camera having a matrix of light sensors and for sending a part at least of the energy in the visible range of said reflected beam towards a second camera also having a matrix of sensors, a digitizing means for delivering a pixel-by-pixel representation of an image in a field of the microscope lens delivered by one or other of the cameras, as digital spatial signals, and a means for processing said spatial signals for reconstituting, from said spatial signals, borders of the individual object and for measuring one of parameters consisting of a distance between said borders and the amount of overlay between the overlapping objects, said amount of overlay being measured by cross-correlation of the spatial signals obtained with signals representing an image symmetrical from that of the spatial signals with respect to an arbitrary origin.

5. A device according to claim 4, wherein said optical fiber system further includes a condenser which is achromatic in the visible and UV ranges, said condenser comprising:

an anti-heat dichroic filter, a first off-axis paraboloid mirror arranged for collimating the light reflected thereby towards a second off-axis paraboloid mirror for refocussing the light at a predetermined point, and a means for filtering said light in the visible and UV ranges disposed in a path of the collimated light beam between said off-axis paraboloid mirrors.

6. A device according to claim 4, further comprising a means placed in the path of the reflected beam downstream of the microscope lens for separating U.V. light from visible light, and for sending the UV light towards the sensors of said first camera and sending the visible light towards the sensors of the second camera.

7. A device according to claim 4, further comprising a means placed in the path of the reflected beam having passed through the microscope lens for directing at least a part of the energy of said reflected beam towards the sensor of a color camera displaying a visual representation of the first object.

8. A device according to claim 4, further comprising a means placed in the path of the reflected beam having passed through the microscope lens for directing at least a part of the energy of said reflected beam towards a spectral analysis means.

9. A device according to claim 4, wherein said means for processing the signals obtained from said cameras comprises a means for automatically measuring and monitoring the width of the lines on a wafer carrying integrated circuit patterns, each of said lines constituting one object.

10. A device according to claim 4, further comprising a coherent light interferometer means for detecting a location, with respect to a reference position, of a table for carrying the individual object, said means comprising a reference mirror connected rigidly to a measuring objective lens and a mirror fixed rigidly to the table.

11. A device for measuring a width of lines on an integrated circuit and an amount of overlay between superimposed patterns on said integrated circuit, comprising:
   an illuminating system having:
      an arc lamp delivering a beam of light at least the visible and UV ranges of the spectrum,
      an optical condenser receiving said beam,
      an optical monofiber having a diameter greater than 500 microns and a length greater than 3 m, arranged to receive said light beam through said condenser at an end thereof and to deliver said light beam at another end thereof,
      a means placed in a path of the beam delivered by the optical monofiber for directing the beam orthogonally on the integrated circuit, said optical means including an achromatic microscope lens, and
      a self-focussing means operating in the range for automatically focussing the microscope lens on the integrated circuit;
   a means placed in a path of light reflected by the integrated circuit and having passed through said microscope lens for separating said light beam and for directing:
      a first sub-beam, containing ultra-violet energy, in a range for which said lines are light absorbing toward a first camera having a first matrix of sensors, and
      a second sub-beam, containing energy in the visible range, toward a second camera having a second matrix of sensors;
   a digitizing means connected to said first and second matrices for delivering a pixel-by-pixel representation of the image in the field of the microscope lens delivered by one and the other of the cameras as digital signals; and
   a signal processing means for processing said digital signals, for measuring the width of any line within a field of view of the first camera and for measuring any amount of overlay between superimposed patterns in a field of view of the second camera.

* * * * *